Oct. 19, 1926.
T. MIDGLEY
1,603,859
DEVICE FOR CUTTING CIRCUMFERENTIALLY ARRANGED MATERIAL
Filed April 26, 1923    2 Sheets-Sheet 1
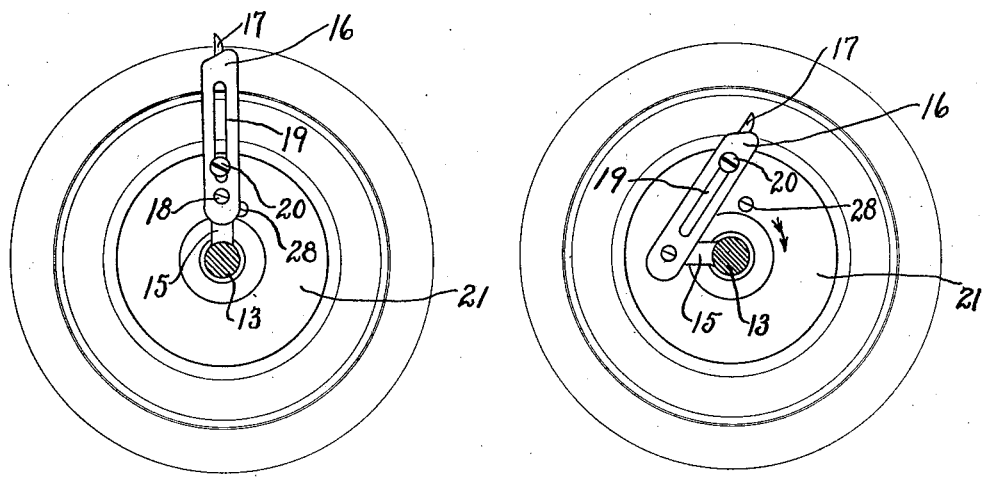
*Fig.1.*  *Fig.2.*
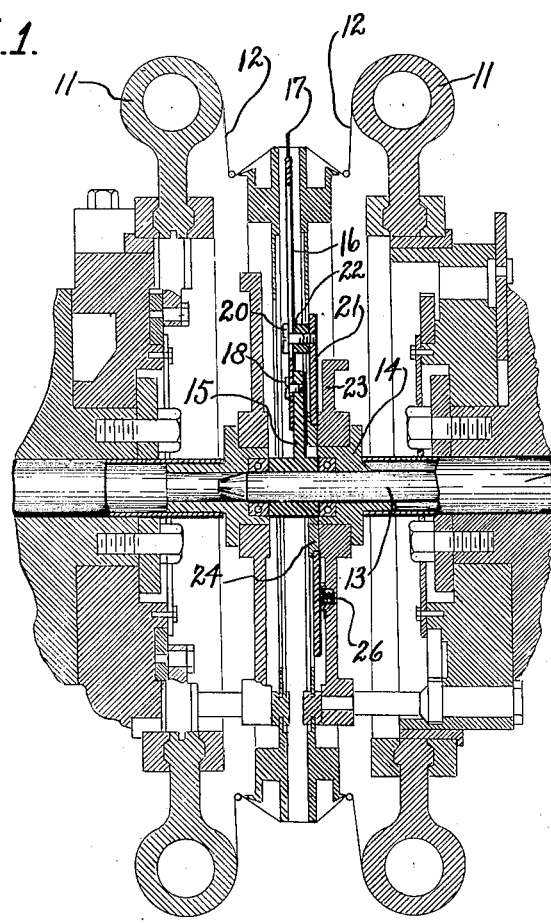
*Fig.3.*
INVENTOR
Thomas Midgley
BY Edward C. Taylor
ATTORNEY Oct. 19, 1926. 1,603,859
T. MIDGLEY
DEVICE FOR CUTTING CIRCUMFERENTIALLY ARRANGED MATERIAL
Filed April 26, 1923    2 Sheets-Sheet 2
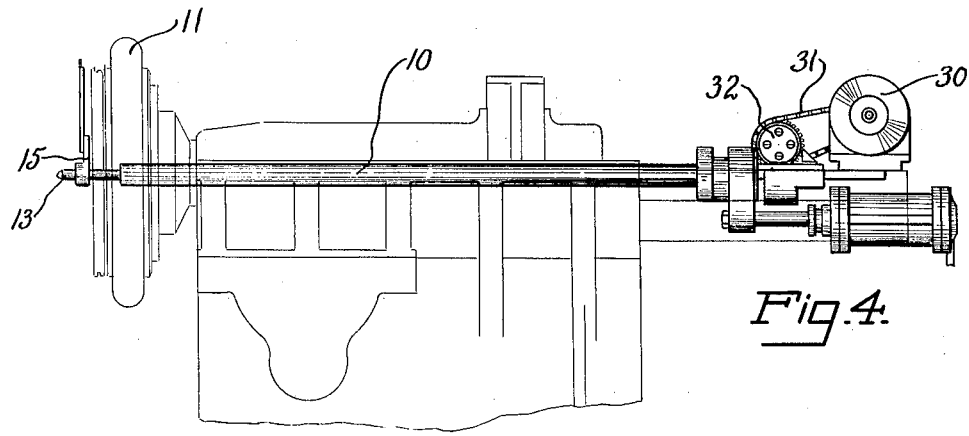
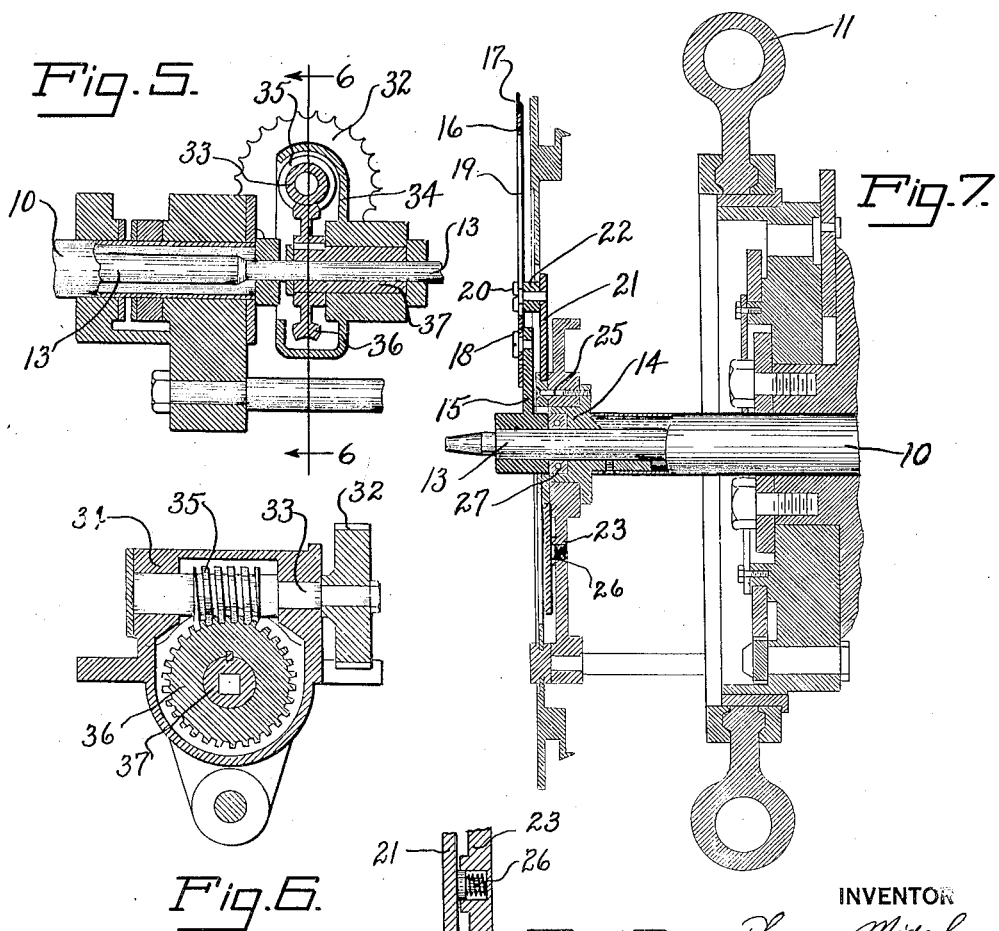
INVENTOR
Thomas Midgley
BY Edward C. Taylor
ATTORNEY Patented Oct. 19, 1926.

1,603,859

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

DEVICE FOR CUTTING CIRCUMFERENTIALLY-ARRANGED MATERIAL.

Application filed April 26, 1923. Serial No. 634,733.

This invention relates to devices for cutting material arranged in circumferential or tubular formation, particularly with respect to improvements in such devices from standpoints of rapidity and accuracy of operation.

The device, which will be described with reference to the accompanying drawings, is illustrated for convenience in the environment of a tire building machine such as that shown in my prior applications Serial No. 547,081, filed March 27, 1922, and 283,879, filed March 20, 1919, of which the present application is a continuation in part.

Fig. 1 is an end view of the knife and connecting parts, with the knife in projected position;

Fig. 2 is a similar view showing the knife retracted;

Fig. 3 is a section through the knife mechanism and the tire building mechanism adjacent, the latter being shown in phantom;

Fig. 4 is a side elevation illustrating one form of driving mechanism for the knife;

Fig. 5 is a detail longitudinal section thereof;

Fig. 6 is a transverse section on line 6—6 of Fig. 5;

Fig. 7 is a section similar to a portion of Fig. 3 but showing the parts in another position; and Fig. 8 is a sectional detail.

In the environment shown the knife mechanism is mounted on a tubular shaft 10 also supporting other parts associated with one of the two annular cores or supports 11 upon which the tire is built. A single knife mechanism is sufficient for both cores, as the material 12 is severed only when the cores are in juxtaposition as shown in Fig. 3.

As stated above, only one of the core supports carries a knife. This core support, that at the right in Fig. 3, and the one shown in Fig. 7, has a shaft 13 extending through it and journaled at its end adjacent the core in a hub 14. Splined to the end of this shaft is a crank arm 15, shown in end view in Figs. 1 and 2. A knife holder 16, carrying a knife 17 at its outer end, is pivoted at 18 to the crank arm. The holder is slotted at 19 for a portion of its length, and a screw 20 passes through the slot and into a plate 21, preferably made relatively heavy for a purpose to appear. A spacing collar 22 holds the knife holder at the proper distance from the plate. The plate fits between the base of the core supporting spider 23 and a ring 24 held thereto as by screws 25. It is thus left free to rotate, although it may be frictionally restrained lightly by a plug 26 (Fig. 8) pressed towards the plate by a spring located in a recess of the spider. A thrust bearing 27 is located between hub 14 and the crank arm 15 to absorb any end thrust involved from the two core heads pressing against each other.

If the knife mechanism be assumed to be in the position indicated in Fig. 2, and if the shaft be rotated in the direction of the arrow in that figure, the following sequence of operations will take place. It will be noticed that in this position the crank arm has drawn the knife holder until the outer end of the slot 19 is against the screw 20. The angular position given to the knife holder will cause the knife to lie well within any line assumed by the material to be severed. Rotation of the shaft in the direction of the arrow will cause the knife holder to slide along the screw until it reaches the position of Fig. 1, the inertia of the plate 21 or friction of the plug 26 preventing rotation of the plate during this much of the motion. When the crank arm and knife holder are in line (Fig. 1) the arm strikes a stop pin 28 on the plate. This causes the crank arm, knife holder, and plate to move as a unit, carrying the knife around in a circular motion one or more times, as may be desired, while extended in cutting position. Upon stopping the rotation of the shaft, if this be done suddenly as is preferable, the inertia of the relatively heavy plate will cause it to overtravel the crank arm, bringing the parts to the same relative position as that shown in Fig. 2 (although the parts may be in a different relative position to other parts of the mechanism). It will be seen that the described mechanism operates to project the knife from inactive to active position, rotate it about a circumference to sever the material, and retract the knife to inactive position.

The driving mechanism for shaft 13 is best illustrated in Figs. 4, 5, and 6. The power for this purpose is provided by a small motor 30 mounted on a rearwardly extending part of the core support. A chain 31 connects a sprocket on the motor shaft with a sprocket 32 fast on a cross shaft 33 suitably journaled in a bracket 34 on the core support. A worm 35 on this cross shaft meshes with a worm wheel 36 splined to a sleeve 37 mounted in the bracket for rotation without longitudinal movement. The sleeve has a square hole in which a square extension of shaft 13 is free to slide. By this means shaft 13 is permitted to partake of the reciprocation of devices with which the knife mechanism is associated, while rotatable in any position by motor 30. Reciprocation of this mechanism is provided for by an air cylinder 38 (Fig. 4), the piston rod 39 of which is attached by a connecting bracket 40 to the tubular shaft 10. Suitable electrical and mechanical controls may be provided for the motor and air cylinder, as will be easily understood.

Having thus described my invention, I claim:

1. A device for severing circumferentially arranged material which comprises a rotatable shaft, an arm fixed thereon, a rotatable disk, means for frictionally restraining the rotation of the disk, a guide on the disk, a knife pivoted to the arm and guided by said guide, means to lock the arm and disk together for rotation when the arm has caused the knife to be projected outwardly, and a source of power for rotating the shaft.

2. A device for severing circumferentially arranged material which comprises a rotatable shaft, an arm fixed thereon, a rotatable disk, a guide on the disk, a knife pivoted to the arm and guided by said guide, and means to lock the arm and disk together for rotation when the arm has caused the knife to be projected outwardly.

3. A device for severing circumferentially arranged material which comprises a rotatable shaft, an arm fixed thereon, a disk of relatively high inertia concentric with the shaft, a knife carrier pivoted to the arm and having a slotted connection with the disk, and a stop on the disk adapted to cause conjoint rotation of the arm and disk when in predetermined positions, whereby upon rotation of the shaft the knife will be projected into cutting position and carried in a circular motion, and upon stoppage of the shaft the inertia of the disk will cause the knife to be retracted.

THOMAS MIDGLEY.